United States Patent
Somorov

[19]

[11] Patent Number: 6,073,649

[45] Date of Patent: Jun. 13, 2000

[54] ADJUSTABLE FLOW LIMITER

[75] Inventor: Michael Somorov, St. Louis, Mo.

[73] Assignee: Emerson Electric Co., St. Louis, Mo.

[21] Appl. No.: 09/062,197

[22] Filed: Apr. 17, 1998

[51] Int. Cl.⁷ .................................................. G05D 16/02
[52] U.S. Cl. ........................ 137/505.41; 137/505; 251/48
[58] Field of Search ................................ 137/505, 505.41; 251/48; 138/41, 43, 46

[56] References Cited

U.S. PATENT DOCUMENTS

| | | |
|---|---|---|
| 2,192,141 | 2/1940 | McElwaine . |
| 2,302,284 | 11/1942 | Abbott . |
| 2,319,659 | 5/1943 | Carnes . |
| 2,747,607 | 5/1956 | Matasovic . |
| 2,753,887 | 7/1956 | Meincke . |
| 2,819,728 | 1/1958 | Gage et al. . |
| 3,104,675 | 9/1963 | Blenman . |
| 3,542,052 | 11/1970 | Irwin . |
| 3,547,143 | 12/1970 | Mills, Jr. . |
| 3,572,390 | 3/1971 | McMicheal ............................... 138/41 |
| 3,825,029 | 7/1974 | Genbauffe ............................ 137/505 X |
| 4,102,357 | 7/1978 | Charlton . |
| 4,209,038 | 6/1980 | Wiggans . |
| 4,311,450 | 1/1982 | Camos . |
| 4,425,939 | 1/1984 | Marinoni et al. ...................... 138/43 X |
| 4,782,850 | 11/1988 | Duffy et al. . |
| 4,828,705 | 5/1989 | Thakore et al. . |
| 4,965,960 | 10/1990 | Moore . |
| 5,065,788 | 11/1991 | McManigal et al. . |

FOREIGN PATENT DOCUMENTS

| | | | |
|---|---|---|---|
| 231200 | 8/1967 | U.S.S.R. .................................. 138/43 |

*Primary Examiner*—Stephen M. Hepperle
*Attorney, Agent, or Firm*—Howell & Haferkamp, LC

[57] ABSTRACT

An adjustable flow limiter for adjustably limiting flow, for example through the vent of a diaphragm-type fluid flow regulator. The adjustable flow limiter has a housing with a compartment therein, and first and second ports communicating with the compartment, the ports and the compartment defining a flow passage through the housing. A foam body is disposed in the compartment in the flow path, and a compressor, preferably in the form of a threaded member, can selectively compress the foam body to adjust the flow rate through the flow passage.

5 Claims, 1 Drawing Sheet

ADJUSTABLE FLOW LIMITER

FIELD OF THE INVENTION

This invention relates to an adjustable flow limiter, and in particular to an adjustable flow limiter for use in diaphragm-type fluid flow regulators.

BACKGROUND OF THE INVENTION

Diaphragm-type fluid flow regulators comprise a housing with a chamber therein and an inlet and an outlet. A valve regulates flow between the inlet and the outlet. A diaphragm in the chamber is connected to the valve so that movement of the diaphragm operates the valve. The chamber is vented to allow air to flow into and out of the chamber to accommodate movement of the diaphragm.

In some instances the air flow through the vent is restricted in order to slow the movement of the diaphragm. One method of restricting vent flow is to provide a small aperture. However, it is expensive to accurately form small apertures. Moreover, these apertures can become blocked by dirt or debris, and the flow rate (and thus the diaphragm speed) cannot be adjusted. Another method of restricting vent flow is with a needle valve. While needle valves do provide adjustability, they are expensive and are also subject to being blocked by dirt and debris.

SUMMARY OF THE INVENTION

The present invention is an adjustable flow limiter that is useful in vents to limit air flow through the vent. Generally the adjustable flow limiter of the present invention comprises a body of porous foam and a compressor for selectively compressing the body to change the flow rate through the foam body.

The flow limiter can be incorporated in a removable cap for the vent in a diaphragm-type fluid flow regulator. The cap has a compartment, and first and second ports communicating with the compartment. The first port is positioned to communicate with the chamber in the flow regulator, and the second port is positioned to communicate with the atmosphere. The first port, the compartment, and the second port form a flow path from the chamber in the fluid flow regulator to the atmosphere. The body of porous foam is disposed in the compartment, in the flow path, between the first and second ports. A threaded member can be threaded into the compartment to selectively compress the foam body in the compartment. The flow rate between the first and second ports through the foam body can be controlled by compressing the foam body. Increasing the compression of the foam body reduces the flow rate and reducing the compression of the foam body increases the flow rate.

The adjustable foam flow limiter of the present invention is of simple and inexpensive construction. Because of the relatively large size of the ports used, and the size of the foam body, it is not readily obstructed with dirt or debris. Lastly, the adjustable flow limiter can be quickly, easily and accurately adjusted to the desired flow rate, allowing accurate control over the operation of the diaphragm in a diaphragm-type fluid flow regulator, or other control of the flow rate through the adjustable flow limiter in other applications.

These and other features and advantages will be in part apparent and in part pointed out hereinafter.

BRIEF DESCRIPTION OF THE DRAWINGS

Corresponding reference numerals indicate corresponding parts throughout the drawings.

DETAILED DESCRIPTION OF THE PREFERRED EMBODIMENT

Figure 1:
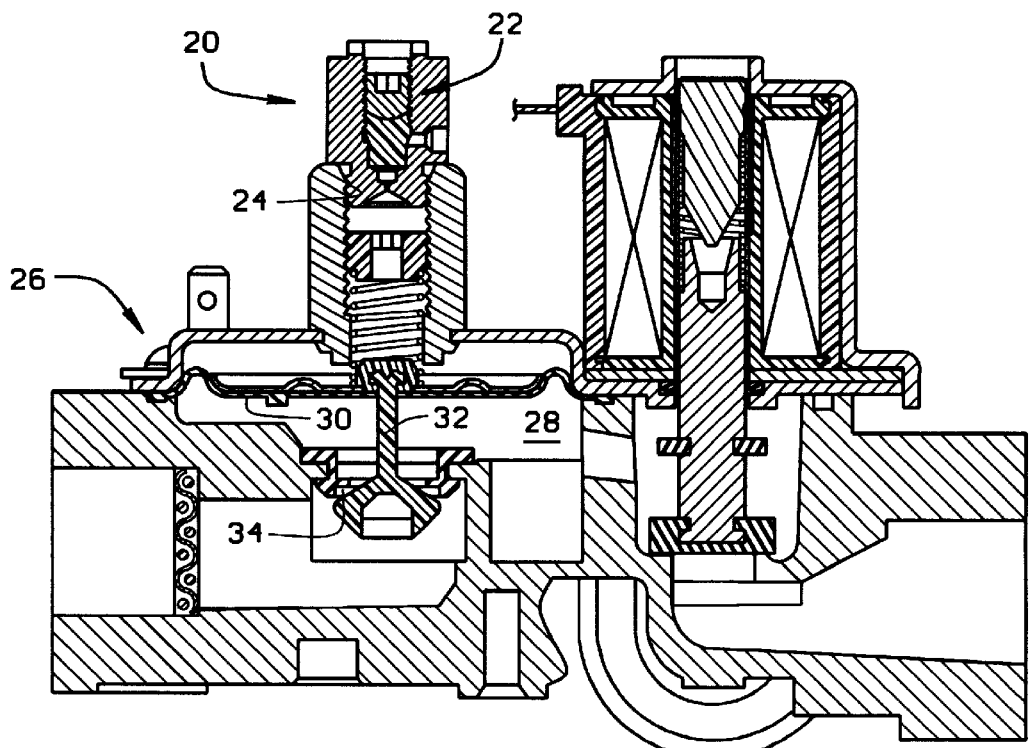
FIG. 1 is a vertical cross-sectional view of a fluid flow regulator incorporating a vent cap with an adjustable flow limiter in accordance with the principles of this invention.

FIG. 1 shows a vent cap 20 incorporating an adjustable flow limiter 22 constructed according to the principles of the present invention, as it would be mounted in the vent opening 24 of an fluid flow regulator 26. The fluid flow regulator 26 is a diaphragm—type flow regulator of the type that might be used to regulate the flow of natural gas or liquified petroleum gas, but the adjustable flow limiter 22 can be applied to other types of fluid flow regulators, and other types of equipment where it is desirable to adjustably limit fluid flow.

Figure 2:
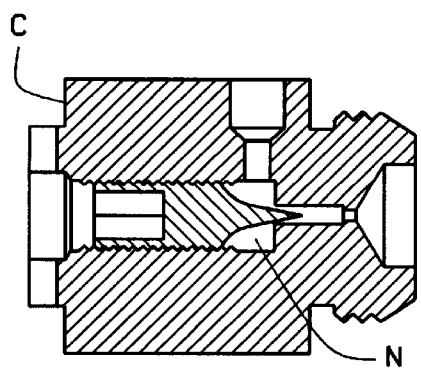
FIG. 2 is a longitudinal cross-sectional view of a vent cap with a needle valve of the prior art.
Figure 3:
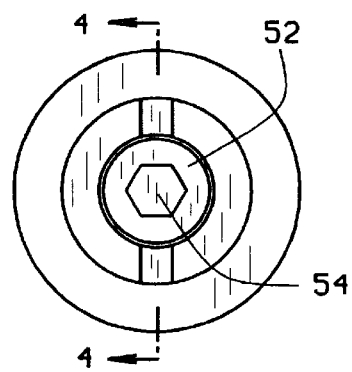
FIG. 3 is an end view of a vent cap with an adjustable flow limiter in accordance with the principles of this invention.
Figure 4:
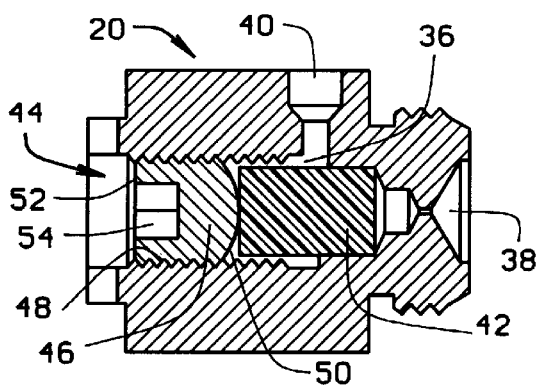
FIG. 4 is a longitudinal cross-sectional view of the vent cap, taken along the plane of line 4—4 in FIG. 3.
Figure 5:
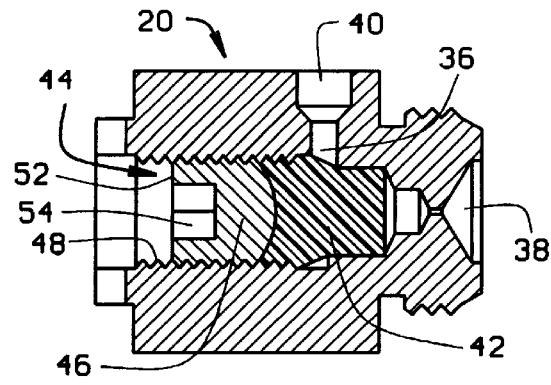
FIG. 5 is a longitudinal cross-sectional view of the vent cap, similar to FIG. 4, but with the threaded member compressing the foam body.

As shown in FIG. 1, the fluid flow regulator 26 has a valve chamber 28 across which a diaphragm 30 extends. The diaphragm 30 moves in response to changes in pressure in the chamber 28 on a first side of the diaphragm, and this movement of the diaphragm moves a valve member 32 relative to valve seat 34, thereby regulating flow through the flow regulator 26. On the second side of the diaphragm 30, the chamber 28 is vented to allow the diaphragm to move. It is sometimes desirable to limit the rate of flow through the vent to thereby control the rate at which the diaphragm moves in response to changes in pressure. In the past, limiting the flow through a fluid flow regulator vent has been accomplished with by providing a vent cap on the vent opening 24 with a very small aperture. It is expensive to manufacture these small apertures, they are prone to being blocked by dirt and debris, and they do not provide adjustability. Another method of limiting the flow through the vent is to provide a vent cap C with a needle valve N, as shown in FIG. 2. While the needle valve N does provide adjustability of the flow rate through the vent, it is expensive and is also subject to being blocked by dirt and debris.

The adjustable flow limiter 22 of the present invention can be conveniently incorporated in a vent cap 20, which acts as the housing for the adjustable flow limiter. The flow limiter 22 includes a compartment 36 in the cap 20 and first and second ports 38 and 40 extending through the cap and communicating with the compartment. The first port 38 is preferably positioned in the cap 20 so that when the vent cap is secured in the vent opening 24 of the fluid flow regulator 26, the first port 38 communicates with the interior of the fluid flow regulator. The second port 40 is preferably positioned in the vent cap 20 so that when the vent cap is secured in the vent opening 24 of the fluid flow regulator 26, the second port communicates with the exterior of the regulator. The first port 38, the compartment 36, and the second port 40 thus provide a continuous flow path from the interior of the fluid flow regulator 26 to the surrounding atmosphere.

In accordance with the principles of this invention, a foam body 42 is disposed in the compartment 36. The compartment 36 is conveniently formed to be cylindrical, and the foam body 42 preferably has a corresponding shape, and is sized to fit snugly within the compartment 36. The foam body 42 is preferably a compressible open-cell foam material that allows the passage of air there through, for example polyurethane. A suitable material is a SIF-FELT foam material available from E.N. Murray Company, Inc. from Denver, Colo. These are reticulated flexible polyester urethane foams or specially engineered physical or chemical variations of polyether foams. They have a three-dimensional structure of skeletal strands. The SIF-FELT foams are compressed reticulated flexible foams made by compressing 90 pore per inch foam with both pressure and heat. The foam is of such density so that slight changes in the compression of the foam do not dramatically change the flow rate through the foam in order to permit fine control over the flow rate. The foam is preferably sufficiently resilient that it expands if the compression is reduced even after extended periods of time. A compressor 44 is provided to selectively compress the foam body 42. In this preferred embodiment the compressor 44 is an externally threaded member 46 that is received in an internally threaded passage 48 communicating with the compartment 36. The member 46 can be threaded into the passage 48 and thus into the compartment 36 to impinge upon and compress the foam body 42, or the member 46 can be threaded out of the passage and out of the compartment to reduce the compression of the foam body. The distal end 50 of the member 46 has a blunt rounded shape for engaging and compressing the foam body 42. The proximal end 52 of the member 46 has a hexagonal socket 54 for receiving an allen wrench to turn the member 46.

The greater the compression on the foam body 42, and thus the greater the density of the foam body, the slower the flow through the foam body between the first port 38 and the second port 40. Conversely, the lesser the compression on the foam body 42, the lesser the density of the foam body, and the faster the flow through the foam body between the first port and the second port.

OPERATION

The adjustable flow limiter 22 is installed in the vent opening of a device, such as fluid flow regulator 26. Air can move into and out of the vent, by passing through the continuous flow path formed by the first port 38, the compartment 36, and the second port 40. The rate of flow through the continuous flow path can be adjusted by adjusting the compression of the foam body 42 in the compartment 36. The member 46 is threaded deeper into the passage 48 to compress the foam body 42 and slow the flow, and the member 46 is threaded out of the passage 48 to apply less compression to the foam body, and increase the flow. The flow rate through the flow limiter 22 can thus be adjusted to achieve the desired operational characteristics of the diaphragm in the flow regulator.

What is claimed is:

1. In a fluid flow regulator of the type having a chamber with a moveable diaphragm therein whose movement in the chamber regulates flow through the regulator, and a vent allowing air to flow into and out of the chamber as the diaphragm moves, the improvement comprising a flow limiter comprising a body of porous foam in the vent, and a compression fitting for adjustably compressing the foam body to adjust the flow rate through the body of foam.

2. The fluid flow regulator according to claim 1 wherein the compression fitting comprises a threaded body that can be threaded toward and away from the foam body.

3. A fluid flow regulator for selectively regulating the flow of fluid, the regulator comprising a housing having a chamber therein; an inlet and an outlet communicating with the chamber; a valve for controlling fluid flow between the inlet and the outlet; a flexible diaphragm in the housing dividing the chamber into two sections and connected to the valve for operating the valve in response to pressure changes in one of the sections of the chamber; a vent allowing air to flow into and out of the other section of the chamber as the diaphragm flexes; and a vent flow limiter, comprising a body of a porous foam in the vent, and a compression fitting for adjustably compressing the foam body to adjust the flow rate through the foam body, and thus through the vent.

4. The fluid flow regulator according to claim 3 wherein the compression fitting comprises a threaded member that can be threaded toward and away from the body.

5. A method of adjusting the response time of a diaphragm-type fluid flow regulator that controls fluid flow in response to the flexing of the diaphragm, and which has a vent allowing air to flow into and out of the regulator in response to the flexing of the diaphragm, and a porous foam body disposed in the vent, the method comprising:

increasing or decreasing the compression of the foam body in the vent to adjust the flow rate of air through the vent to thereby control the speed with which the diaphragm moves.

* * * * *